United States Patent
Wang

(10) Patent No.: US 11,883,817 B2
(45) Date of Patent: Jan. 30, 2024

(54) EQUIPMENT AND METHODS FOR AUTOMATED SAMPLE PROCESSING FOR DIAGNOSTIC PURPOSES

(71) Applicant: Yantai Ausbio Laboratories Co., Ltd., Shandong (CN)

(72) Inventor: Zhaoqiang Wang, Shandong (CN)

(73) Assignee: Yantai Ausbio Laboratories Co., Ltd.

( * ) Notice: Subject to any disclaimer, the term of this patent is extended or adjusted under 35 U.S.C. 154(b) by 767 days.

(21) Appl. No.: 16/480,657

(22) PCT Filed: Jan. 25, 2017

(86) PCT No.: PCT/CN2017/072654
§ 371 (c)(1),
(2) Date: Jul. 24, 2019

(87) PCT Pub. No.: WO2018/137186
PCT Pub. Date: Aug. 2, 2018

(65) Prior Publication Data
US 2019/0366328 A1    Dec. 5, 2019

(51) Int. Cl.
*B01L 3/00* (2006.01)
*B01L 9/06* (2006.01)
(Continued)

(52) U.S. Cl.
CPC ............ *B01L 3/5021* (2013.01); *B01L 9/06* (2013.01); *G01N 35/0099* (2013.01);
(Continued)

(58) Field of Classification Search
CPC .... B01L 3/5021; B01L 9/06; B01L 2300/042; B01L 2300/044; B01L 2300/0832; G01N 2035/00495; G01N 35/0099
See application file for complete search history.

(56) References Cited

U.S. PATENT DOCUMENTS

| 4,576,185 A | 3/1986 | Proud et al. |
| 6,516,953 B1 | 2/2003 | DiCesare et al. |

(Continued)

FOREIGN PATENT DOCUMENTS

| CN | 101559401 | 10/2009 |
| CN | 201596518 | 10/2010 |

(Continued)

OTHER PUBLICATIONS

International Search Report and Written Opinion, dated Oct. 27, 2017, for PCT Application No. PCT/CN2017/07264, 6 pages.

(Continued)

*Primary Examiner* — Jill A Warden
*Assistant Examiner* — Dwayne K Handy
(74) *Attorney, Agent, or Firm* — Klarquist Sparkman, LLP

(57) ABSTRACT

A tube for sample collection and sample processing in a tube rack includes an upper section, an intermediate section, and a lower section. The intermediate section connects the upper section and the lower section of the tube, and an inner diameter of the intermediate section can decrease from top to bottom. A fastening means can fix the tube in a tube rack. The tube can include a pierceable tube cap sealing the tube, and the tube rack can be configured such that the tube may be pulled off the tube cap by a centrifugation force. The tube can include a volume of density gradient medium covered by a separating gel to enhance sample separation.

23 Claims, 11 Drawing Sheets

(51) Int. Cl.
*G01N 35/00* (2006.01)
*B04B 5/04* (2006.01)

(52) U.S. Cl.
CPC ... *B01L 2300/021* (2013.01); *B01L 2300/042* (2013.01); *B01L 2300/044* (2013.01); *B01L 2300/0832* (2013.01); *B04B 5/0421* (2013.01); *B04B 2005/0435* (2013.01); *G01N 2035/00495* (2013.01)

(56) References Cited

U.S. PATENT DOCUMENTS

| | | |
|---|---|---|
| 2002/0187130 A1 | 12/2002 | Kindness et al. |
| 2004/0013575 A1* | 1/2004 | Stevens ............ A61B 5/150389 422/550 |
| 2010/0120133 A1 | 5/2010 | Walsh et al. |
| 2011/0003674 A1 | 1/2011 | Fox et al. |
| 2018/0010990 A1* | 1/2018 | Cherubini ............. B04B 5/0407 |

FOREIGN PATENT DOCUMENTS

| | | | |
|---|---|---|---|
| CN | 102203588 A | | 9/2011 |
| CN | 102321583 A | | 1/2012 |
| CN | 102533650 | | 7/2012 |
| CN | 205146269 | | 4/2016 |
| CN | 106257289 A | | 12/2016 |
| EP | 2929939 | | 10/2015 |
| EP | 3 015 169 A1 | | 4/2016 |
| JP | S6184557 A | | 4/1986 |
| JP | H03293047 A | | 12/1991 |
| JP | H06194280 A | | 7/1994 |
| JP | 2012507284 A | | 3/2012 |
| WO | WO 91/16242 | * | 10/1991 ............ B01L 3/5021 |
| WO | WO 95/20429 | | 8/1995 |
| WO | WO 2010/132829 A2 | | 11/2010 |
| WO | WO 2014/051037 A1 | | 4/2014 |

OTHER PUBLICATIONS

Extended European Search Report, dated Jul. 1, 2020, issued for European Patent Application No. 17893964.1, 10 pages.

* cited by examiner

EQUIPMENT AND METHODS FOR AUTOMATED SAMPLE PROCESSING FOR DIAGNOSTIC PURPOSES

CROSS REFERENCE TO RELATED APPLICATION

This is the U.S. National Stage of International Application No. PCT/CN2017/072654, filed Jan. 25, 2017, which was published in English under PCT Article 21(2). International Application No. PCT/CN2017/072654 is incorporated herein by reference in its entirety.

FIELD OF THE INVENTION

The invention relates to the field of automated sample processing for diagnostics purposes. More particularly, the present invention is directed to enhanced and coherently designed equipment and methods to allow for automated sample processing for diagnostic purposes to enhance both sample throughput and diagnostic precision.

BACKGROUND OF THE INVENTION

One of the key focus of reagent developers and diagnostic instrument manufacturers is reliability, sensitivity and specificity of tests. Early detection is an important countermeasure to mitigate the various risks associated with an infection. Erroneous results in identifying infected samples may be life-threatening for literally everyone exposed to the source of the sample or the samples of the source. Blood donors, laboratory personnel and blood recipients may be mentioned as examples.

Therefore, sample screening reagents are continuously improved and advanced screening technologies are further developed and adopted in diagnostic instruments to revamp said reliability and sensitivity. On the one hand, automated diagnostic instrumentation may increase reliability and sensitivity by integrating ever more functions in the diagnostic instruments to replace manual intervention so human errors are reduced and precision is enhanced. In addition, turn-around time of samples may be reduced because automated sample processing typically significantly increases sample throughput. On the other hand, reagent kit manufacturers strive for the capability to detect and measure health-associated biomarkers with increasingly specific, reliable and sensitive methods. However, in recent times there has been little advancement which was broadly applicable for routine clinical analysis at a reasonable cost and performance, and there are still many cases of pathogen detection failures every day.

Such detection failures are often due to the characteristics of the latent or occult phase of the pathogen lifecycle, in which the sample might be taken from the wrong source: Occult hepatitis B virus (HBV) infection (OBI) is, for instance, by definition "*characterized by the persistence of HBV [deoxyribonucleic acid] (DNA) in the liver tissue in the absence of circulating HBV surface antigen (HBsAg)*" (c.f. J Hepatol. 2008; 49 652-7).

It is well known in the art that sampling of whole blood are typically collected by venipuncture through a needle attached to an evacuated blood collection tube. Centrifugation splits the sample into its components, wherein the filter and/or density gradient medium may help splitting at least two of these components. The separate analysis of the split components increases the number of processing steps significantly, however, thanks to the purity of the samples components, the reliability and sensitivity of the screening may be greatly increased.

Conventional samples for conducting tests include plasma or serum, these are the major blood components that are easily accessible after separation from whole blood. Although plasma is a major reservoir for pathogen and current standard of practice for blood screening, recent published papers showed evidence that the cellular contents circulating in blood are also very useful in diagnostics. Typically, during latent phase or at an early phase of infection, it may not be possible to detect targeted serological markers in plasma because the analytes are not yet being released from the infected cells or the traces of analytes are beyond limit of detection (LOD). For instance, viruses can either directly interact with platelets via a plethora of surface receptors, some pathogens such as the dengue virus (DENV) may enter platelet, and pirating within vesicles. Some pathogens, including the human immunodeficiency virus (HIV), bind or wrap within extracellular vesicles (EVs), such as exosomes and micro-vesicles. Moreover, traces of the HIV genome have been found in natural killer (NK) cells, mononuclear cells and mast cells. Hepatitis B and hepatitis C viruses (HCV) do not only infect liver cells, but also reside in peripheral blood mononuclear cells (PBMCs). They can infect B cells and replicate therein. Thus, white cells, particularly PBMCs, are a pathogen key reservoir for replication as well as a potential infectious site during the pathogen latent period.

The cellular contents may also offer insightful information in tumor-related diagnostics. Blood can be separated into different fractions in order to enrich for tumor-associated biomarkers. Circulating tumor cells (CTCs) may provide genomic, transcriptomic, and proteomic information on the tumor. Tumor Educated Platelets (TEPs) may provide a valuable platform for pan-cancer, multiclass cancer, and companion diagnostics in both localized and metastasized cancer patients.

It is thus critical for the device manufacturers, laboratory test vendors, and clinical laboratory personnel to understand these pathogen-cell interactions as potential source of improvements during analytical laboratory testing. Plasma or serum as conventional targeted sample is apparently insufficient to establish a comprehensive and complete analysis that covers the entire pathogen lifecycle.

However, current routine clinical practices are yet unable to fully incorporate cellular analysis for both economical and practical reasons. An important reason is the challenge to extract the cellular content from regular evacuated blood collection tubes in a high throughput and automated fashion.

Typically, cell separator tubes including a filter are used and/or density gradient medium is added to the sample and the samples are centrifuged. For example, U.S. Pat. Nos. 4,021,340 and 4,333,564 describe the use of hydrophobic gel-like, inert compositions having thixotropic properties. Commercial products such as BD's Vacutainer™ Cell Preparation tube (CPT) is expensive and cannot be processed in an automated procedure. Due to the shape of the tube, the enriched buffy coat layer is very thin, identification by camera is difficult and the pipette channels may be clotted due to the thick gel separator applied. In addition, the tube made glass material may also break, particularly when handled by robotics.

In contrast, single layer tubes made in a single shot of injectable plastic material are cost-effective as compared to multilayer tubes, tubes made of glass or metal, or tubes with a chemical coating applied to their inner surface. However, e.g. evaporation of density gradient medium may be an issue. Experiments showed, that a standalone PETG/PET tube may lose 0.4 μl of liquid per 24 hours. Collection tubes made of glass, metal or having multilayer wall, or with inner surface chemical coating do not have the risk of vaporization, but they are unfeasible for routine clinical use for economic reasons.

Hence, there is a need for affordable evacuated blood collection tubes and associated processing systems that can be used in automated and effective blood content fractionation and extraction in routine clinical practice.

Tubes of the aforementioned types are for example discussed in the following prior art references:

U.S. Pat. No. 3,786,985 discloses a blood collection container having a reduced portion disposed between its closed longitudinal ends and a stopper means disposed therein and adopted under the influence of centrifugal force to be securely received in the reduced portion.

U.S. Pat. No. 7,971,730 discloses methods of producing collection tubes. The methods include providing a separator substance that can rapidly polymerize in a short time to a desired hardness and disposing the separator substance within the lumen of the tube. The separator substance is formulated to have a density between an average density of a serum fraction of whole blood and a cell-containing fraction of whole blood, and to be flowable with whole blood. Upon centrifugation of a tube having blood, the separator substance forms a barrier between the whole blood fractions.

CN 100500825 C discloses a lymphocyte separation tube, which comprises a tube body. The bottom of the tube body comprises porous material. The porous material absorbs and retains lymphocyte separation medium. The porous material is fixed to the bottom of the tube by friction force. During centrifugation, red blood cells can easily enter the porous material, in replacement of the lymphocyte separation medium.

Moreover, in the prior art, it is known that tubes may use adapters for the centrifugation:

CN 201410416 Y discloses an automatic uncovering adapter of a vacuum blood collecting tube. The adapter includes an adaptive pallet which is fixed on a centrifuge rotating disc and is provided with blood collecting tube jack. The adaptive pallet is equipped with an uncovering stand. Blood collecting tube inserting channels are uniformly distributed on the stand body of the uncovering stand. The inner diameter of the blood collecting tube inserting channel is matched with the outer diameter of the blood collecting tube. After the centrifuge rotates, the blood collecting tube body is automatically disengaged from the cap of the blood collecting tube under the action of centrifugal force.

CN 103657887 B discloses a centrifugal machine adapter comprising a first adapter main body section, a second adapter main body section, a third adapter main body section, a first locating pin, a second locating pin, a first mark and a second mark. Blind holes are formed in the first adapter main body section, and the depth of the blind holes is smaller than the length of a tube body.

The prior art does not present a tube and coherently designed means for cost-efficient and coherent separator equipment and methods that are compatible with automated diagnostic platforms to improve the screening process in terms of short turn-around times, high throughput and ease of use. The present invention thus aims at overcoming the aforementioned shortcomings of the conventional equipment and methods.

SUMMARY OF THE INVENTION

The present invention solves the shortcomings of the state of the art by suggesting a tube, a tube rack configured for said tube, a continuous two-step centrifugation method, a method for automated sample processing and a method to produce the tube in accordance with the features of the independent claims. Preferred embodiments are defined in the dependent claims.

The present invention improves the previously known solution in that it provides a coherent design and the means for automation to make highly reliable and highly sensitive blood screening affordable. More details on the structure and the advantages of the coherent design of the separator equipment with regard to a cost-efficient automated screening procedure are described in the following.

Enhanced Tube for Sample Collection and Sample Processing

In a first aspect of the invention, a tube for sample collection and sample processing is provided. The tube according to the present invention comprises an upper section, an intermediate section, and a lower section, wherein the upper section and the lower section are substantially of cylindrical shape, e.g. apart from manufacturing tolerances.

In a first embodiment, the upper section has an inner diameter larger than an inner diameter of the lower section and the upper section has an outer diameter larger than an outer diameter of the lower section. The intermediate section is located between the upper section of the tube and the lower section, wherein a top of the intermediate section connects to a bottom of the upper section and a bottom of the intermediate section connects to a top of the lower section. An inner diameter and an outer diameter of the intermediate section decreases from the top to the bottom of the intermediate section of the tube. The tube exhibits a plurality of fastening means for fixing the tube in a tube rack. The plurality of fastening means is located on an outer surface of the intermediate section and the lower section. The fastening means thus guarantee precision and mechanical stability of the shape of the tube across its lifetime as well as stabilize the tube throughout the subsequent automated processing procedure.

In a second embodiment, the intermediate section of the tube according to the first embodiment is of a tapered shape. This allows that a desired buffy coat layer can be easily harvested in the lower section of the tube. Pipetting in the buffy coat layer may be challenging because of clotting at the tip of the pipette, in particular if the viscosity of the separator gel in the tube is low.

In a third embodiment, the plurality of fastening means in the tube according to any of the aforementioned embodiments has a plurality of longitudinally extending tube ribs for fixing the tube in the tube rack. This further improves the stability during the automated processing procedure.

In a fourth embodiment, the outer diameter at the top of the intermediate section of the tube is substantially equal to the outer diameter of the upper section. The inner diameter at the top of the intermediate section is substantially equal to the inner diameter of the upper section.

In a fifth embodiment, in the tube according to any of the aforementioned embodiments, the inner diameter at the bottom of the intermediate section is substantially equal to the inner diameter of the lower section. The outer diameter at the bottom of the intermediate section is substantially equal to the outer diameter of the lower section.

In a sixth embodiment, the tube according to any of the aforementioned embodiments is further improved in that it provides for the plurality of tube ribs that may be spaced apart at equal distances.

In a seventh embodiment, the tube according to the sixth embodiment is further characterized in that the plurality of tube ribs consist of two tube ribs that are 180° apart from each other.

In an eighth embodiment, tube according to any of the aforementioned embodiments is further improved in that the plurality of tube ribs extend along the whole length of the intermediate and the lower section.

In a ninth embodiment, the tube according to any of the aforementioned embodiments is further characterized in that the outer diameter of the upper section is substantially equal to a distance ranging from an outer edge of a first tube rib of the plurality of tube ribs to an outer edge of a second tube rib of the plurality of tube ribs.

In an tenth embodiment, as an example, the tube according to any of the aforementioned embodiments is further characterized in that the inner diameter at the top of the intermediate section of the tube is 10.5 mm, and/or the inner diameter at the bottom of the intermediate section of the tube is 6.5 mm, and/or a thickness of the tube ribs is 2.0 mm.

In an eleventh embodiment, the tube according to any of the aforementioned embodiments is further characterized in that the tube comprises a tube cap, wherein the tube cap is insertable into the upper section such that the tube cap seals the tube, and the tube cap is configured to be held against a force in an axial direction towards the lower end of the lower section of the tube such that the tube is pulled off the tube cap by said force.

In a twelfth embodiment, the tube according to the eleventh embodiment is further improved in that the tube cap comprises a tube cap body and a tube cap plug. The tube cap plug may be inserted into the upper section such that the tube cap plug seals the tube. The tube cap body may be configured to be arranged around the upper section and to engage the tube cap plug. The tube cap body may further be configured to be held against a force in an axial direction towards the lower end of the lower section of the tube such that the tube may be pulled off the tube cap by said force.

In a thirteenth embodiment, the tube according to the eleventh or twelfth embodiment is further improved in that the tube cap is pierceable by a needle such that an evacuated tube with the tube cap inserted into the upper section receives a sample through the needle pierced into the tube cap.

In a fourteenth embodiment, the tube according to the twelfth or thirteenth embodiment is further characterized in that the tube cap body has substantially the shape of a cylindrical tube. In such a case, an inner diameter of a lower portion of the tube cap body is substantially equal to the outer diameter of the upper section, and an inner diameter of an upper portion of the tube cap body is substantially equal to the diameter of the upper cylindrical bar of the tube cap plug.

In a fifteenth embodiment, in the tube according to any of the twelfth to fourteenth embodiments, the tube cap body comprises at least two circumferentially protrusions to engage the tube cap and the tube cap plug. This may further reduce the risk of cross-contamination, since tube caps may remain fixed in their position, when the tube cap is fixed in a tube rack head.

In a sixteenth embodiment, the tube according to any of the eleventh to fifteenth embodiments with the tube cap inserted into the upper section of the tube, the tube further comprises contents. The contents may comprise a volume of a density gradient medium in a lowest portion of the tube. The volume of the density gradient medium may be separated towards a portion above the lowest portion of the tube by a volume of a separating gel forming a gel barrier between the density gradient medium and the portion above the lowest portion of the tube. An inner surface of the tube above the gel barrier may be coated with an atomized anticoagulant. A maximum volume of the tube above the gel barrier and below the tube cap may be evacuated.

In a seventeenth embodiment, the tube according to the sixteenth embodiment is further improved in that the tube cap and the contents of the tube are sterilized. Sterilization by Gamma irradiation may be mentioned as example.

In an eighteenth embodiment, the tube according to the sixteenth or seventeenth embodiments is further characterized in that the density gradient medium has a density between 1.01 and 1.119 g/ml, more preferably between 1.077 and 1.083 g/ml.

In a nineteenth embodiment, the tube according to any of the sixteenth to eighteenth embodiments is further characterized in that the volume of the density gradient medium is between 100 and 600 µl, preferably between 200 and 600 µl, 300 to 600 µl, 400 and 600 µl, 500 to 600 µl and most preferably 450 µl. The volume of the separating gel may be between 35 and 60 µl, most preferably 50 µl.

In a twentieth embodiment, the tube according to any of the aforementioned embodiments is manufactured by plastics injection molding. However, other manufacturing methods can also be applied.

In a twenty-first embodiment, the tube according to any of the first to nineteenth embodiments is, for instance, made of glass.

In a further embodiment, the tube according to any of the aforementioned embodiments further comprises, as an example, an outwardly extending spherical ending for closing the tube at a lower end of the lower section of the tube.

Tube Rack

In a second aspect, a tube rack that is configured to receive one or more tubes according to any of the first to twenty-first embodiments is provided. In a first embodiment of the tube rack, the tube rack comprises a tube rack body comprising one or more tube holders. Each of the tube holders is shaped to seamlessly receive one of said tubes and comprises reception means to receive the plurality of fastening means located on the outer surface of the intermediate section and the lower section of the tube.

In a second embodiment of the tube rack, the tube holders comprise symmetrical trajectories to receive the plurality of fastening means.

In a third embodiment of the tube rack, the tube rack according to any of the aforementioned embodiments further comprise a wall to provide a structural rigidity, and a non-noise background allowing for automated content identification.

In a fourth embodiment of the tube rack, the wall of the tube rack according to the third embodiment of the tube rack comprises an opening to expose a front side of the tube.

In a fifth embodiment of the tube rack, the tube rack according to any of the aforementioned embodiments further comprises a separable tube rack head, wherein the tube rack head comprises one or more openings corresponding to the one or more of the tube holders. Each of the tube holders may comprise a protruding ring to align to a corresponding groove on an underside of each of the one or more openings of the separable tube rack head.

In a sixth embodiment of the tube rack, the tube rack head in the tube rack according to the fifth embodiment further comprises one or more clippers configured to engage in a recess on the tube rack body.

In a seventh embodiment of the tube rack, the tube rack according to any of the aforementioned fourth to sixth embodiments is further characterized in that each of the one or more openings of the tube rack head comprises a crown-shaped upper part, wherein each crown-shaped upper part comprises one or more inwardly extending bumps.

In an eighth embodiment of the tube rack, the tube rack according to any of the aforementioned fourth to seventh embodiments is further characterized in that the tube comprises the tube cap comprising the tube cap body and the tube cap plug, wherein the tube rack head is configured to capture the tube cap so that there is a gap between the lowest portion of the tube and a bottom of the tube rack body.

In a ninth embodiment of the tube rack, the tube rack according to any of the aforementioned fourth to seventh embodiments is further characterized in that the tube rack head is configured to capture the tube cap so that the lowest portion of the tube contacts a bottom of the tube rack body.

In a tenth embodiment of the tube rack, the tube rack according to any of the aforementioned embodiments is characterized in that the tube holders are arranged in two or more rows.

Centrifugation Process for Enhanced Sample Enrichment

In a third aspect, an enhanced continuous two-step centrifugation method for enhanced sample enrichment is provided. The tube is preferably of the configuration as described in any of the sixteenth to twenty-first embodiment. Moreover, the tube rack according to any of the aforementioned embodiments may be used for carrying out the continuous two-step centrifugation method for enhanced sample enrichment.

The centrifugation method comprises the steps of centrifuging for a first period of time at a first relative centrifugation force (RCF). The first RCF is applied without changing a relative position of the density gradient medium in the tube to achieve an initial cell separation. In some embodiments, the first period of time is at least 10 minutes, and preferably at least 15 minutes. In preferred embodiment, the first period of time is in the range of 15 to 20 minutes, and the first RCF is in the range of 50 to 200 RCF, and most preferably in the range of 150 to 200 RCF.

The centrifugation method also comprises performing further centrifuging for a second period of time at a second RCF without stopping the centrifuging. The second RCF may change the relative position of the density gradient medium in the tube. The second RCF may, for instance, be performed by accelerating to the range of 400 to 800 RCF, preferably in the range of 400 to 650 RCF, without stopping the centrifuging. In some embodiments, the second period of time may be at least 5 minutes preferably at least 15 minutes. In a preferred embodiment the second period of time is in the range of 15 to 30 minutes.

In some embodiments the centrifuging for the second period of time is performed by accelerating to 600 to 650 RCF.

Automated Sample Processing

In a fourth aspect, the invention provides for a method for automated sample processing.

The automated sample processing method may in particular comprise the steps of
a) transferring, by means of a robot comprising a gripper, a tube rack comprising one or more tubes from a tray to a support located in a centrifuge,
b) applying at said centrifuge the continuous two-step centrifugation method,
c) after said continuous two-step centrifugation method, extracting, by means of the robot, the tube rack head from the tube rack body by grabbing the tube rack head such that the clippers disengage the tube rack body,
d) after said extraction of the tube rack head, extracting, by means of the robot, the tube rack body from the support of the centrifuge by grabbing the tube rack body.

The tube may be configured according to any of the sixteenth to twenty-first embodiment, the tube rack head according to any of the aforementioned embodiments of the tube rack head, and the centrifugation method may correspond to any of the aforementioned embodiments for the centrifugation method.

Manufacturing Process

In a fifth aspect, a method to produce the tube is provided. A tailored manufacturing process may be required to guarantee that manufacturing tolerances are met. The tube shall, for instance, be highly concentric. Eccentric tubes may cause varying volumes of samples collected in the tube, which may ultimately lead to inaccurate liquid handling after centrifugation.

Highly concentric tubes may be manufactured by locating at least two injection inlet channels in a molding form corresponding to the tube. The at least two injection inlet channels may be located equally spaced apart around a perimeter located at a top of the upper section to enable injection from an outer surface at the top of the upper section.

The method may further comprise vacuum sealing and aluminum packaging to prevent evaporation of density gradient medium prior to use. Vacuum sealing and aluminum packaging prevents shrinking and therefore helps maintaining the impermeability of the tube prior to use.

DETAILED DESCRIPTION OF THE PREFERRED EMBODIMENTS

In the following, preferred embodiments of the invention are described with reference to the figures, in which.

Figure 5:
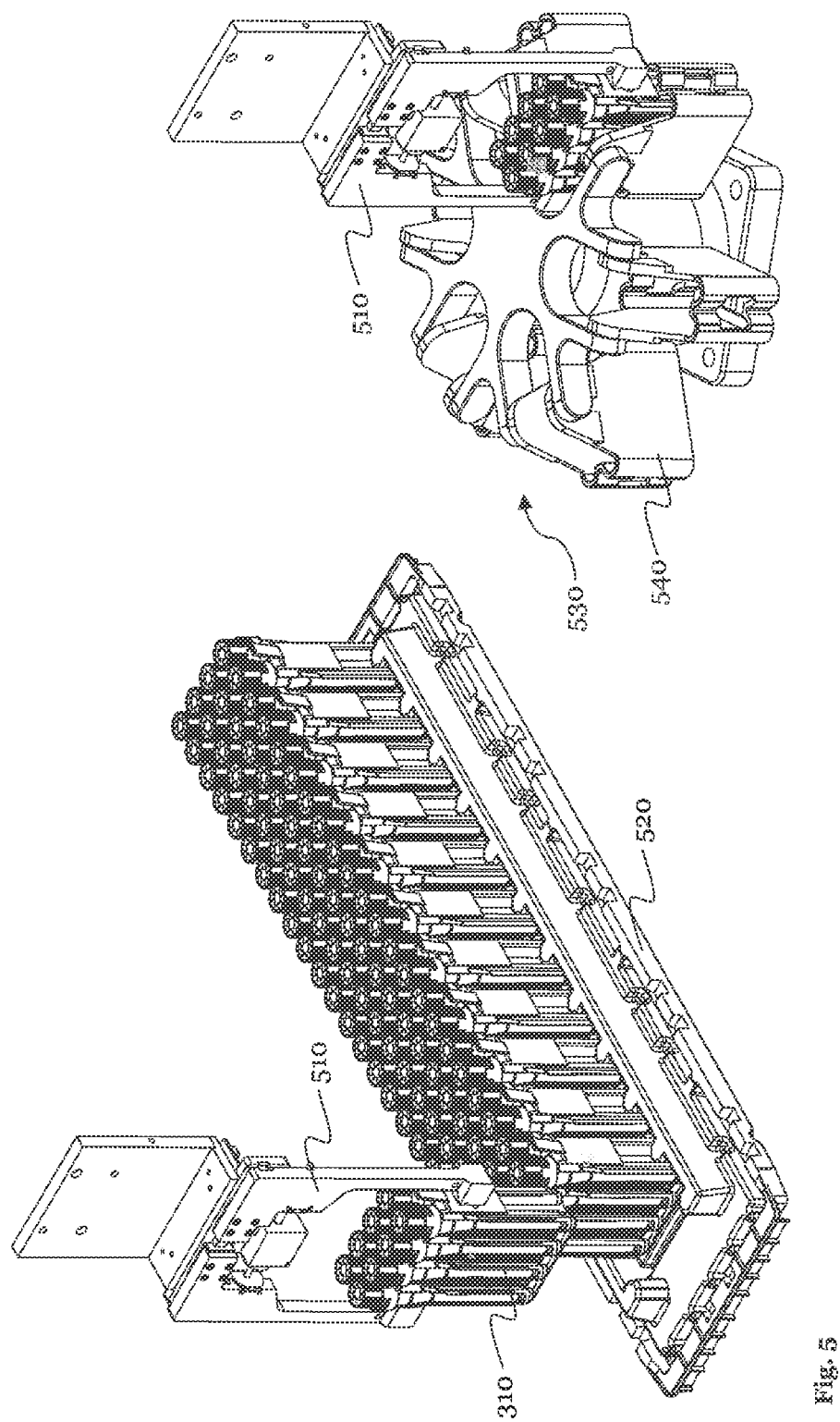

FIG. 5 illustrates an exemplary embodiment according to the invention of a first step of the method for automated sample processing, in which a tube rack including tubes and tube caps is transferred, from a tray full of tube racks (left part of the figure) to a support located in a centrifuge (right part of the figure), wherein the transferring is performed by means of a robot comprising a gripper.

Figure 6:
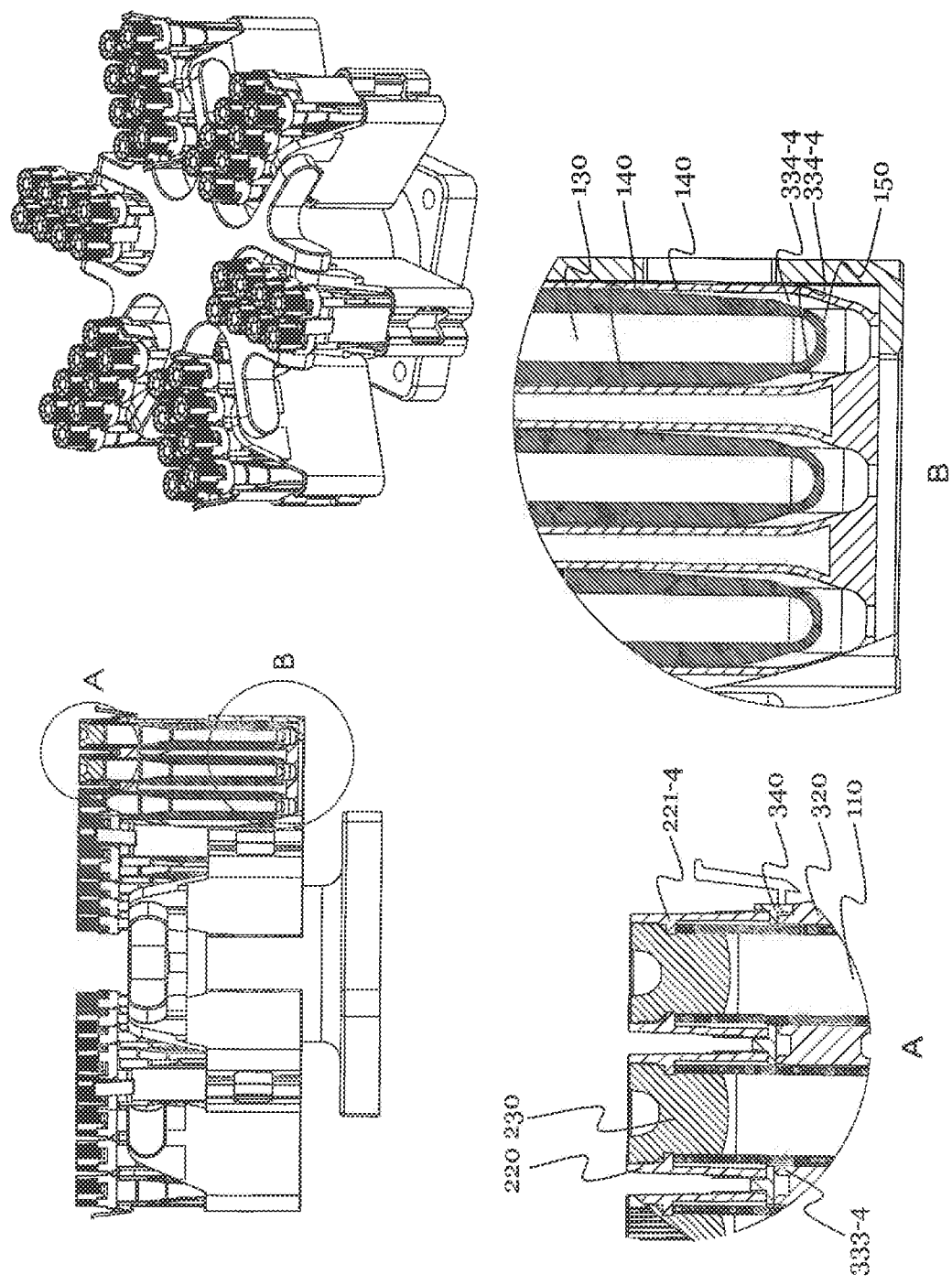

FIG. 6 shows a various views of a centrifuge before centrifugation, according to an exemplary embodiment according to the invention. The centrifuge is fully equipped with tube racks (as described and illustrated in FIG. 5). Sections A and B of FIG. 6 show enlarged sections of longitudinal cuts of the tube racks, when placed in the centrifuge. Sections A and B of FIG. 6 also illustrate that the tubes are closed in the tube rack before centrifugation.

Figure 7:
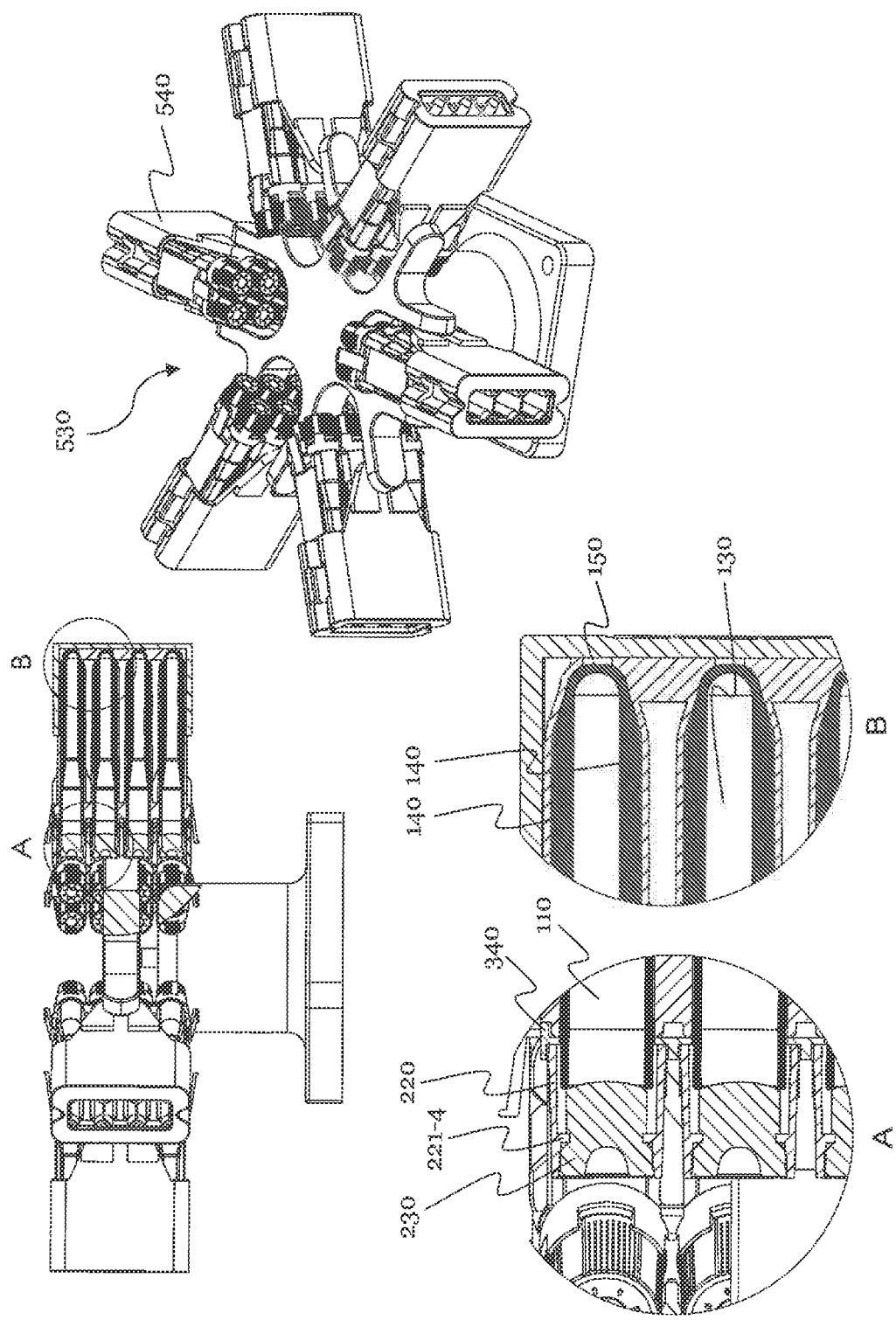

FIG. 7 shows various views of a centrifuge during a second step of the continuous two-step centrifugation according to the invention, according to an exemplary embodiment. The centrifuge is fully equipped with tube racks (as described and illustrated in FIG. 5). Sections A and B show enlarged sections of longitudinal cuts of the tube racks, when the centrifuging is performed in the centrifuge. Sections A and B of FIG. 7 also illustrate that the tubes are opened in the tube rack throughout the second step of the continuous two-step centrifugation.

Figure 8:
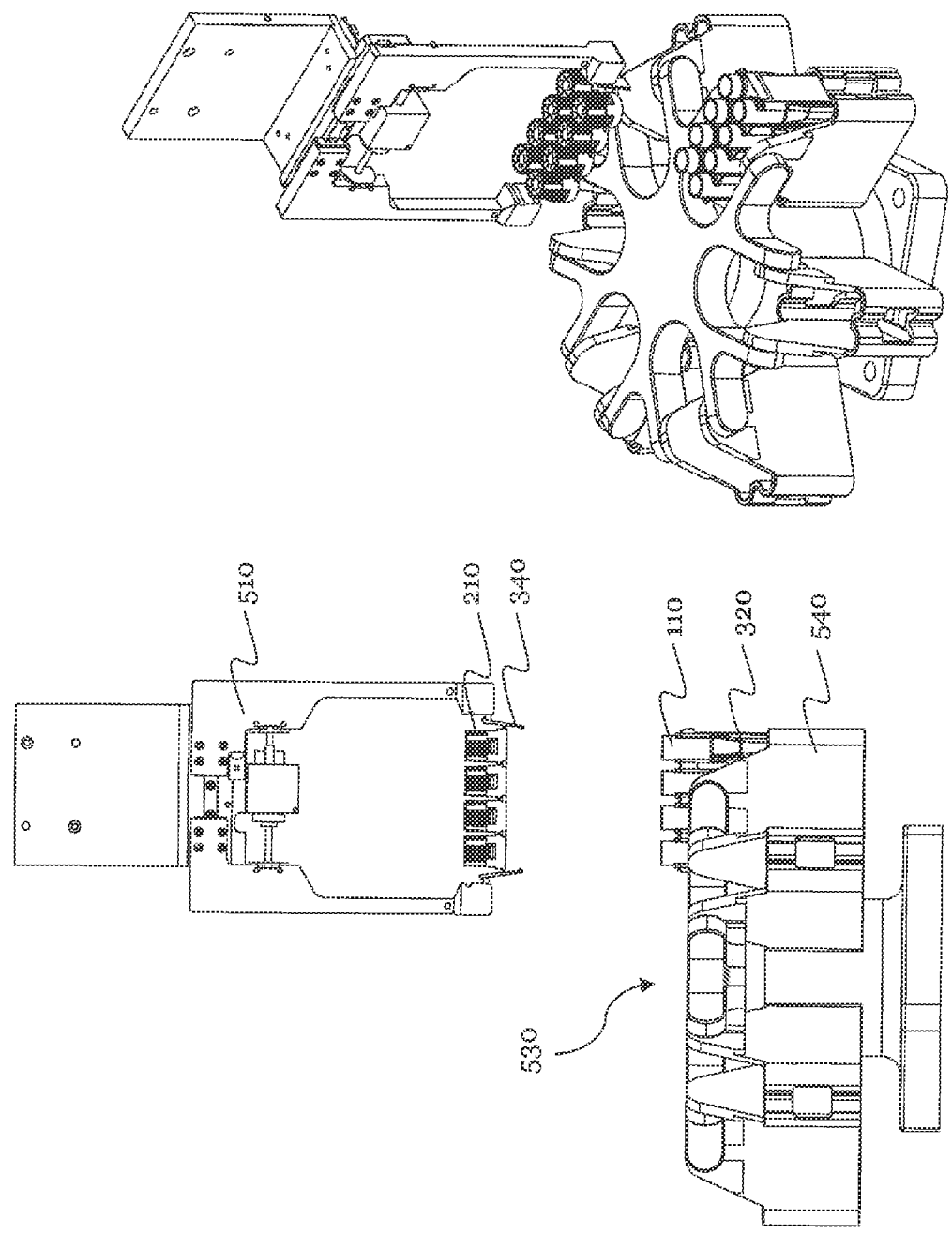

FIG. 8 illustrates an exemplary embodiment of a second step of the method for automated sample processing according to the invention, in which a tube rack head (including tube caps) is extracted from the tube rack body (including tubes) such that the clippers disengage the tube rack body. Extracting is performed by means of a robot comprising a gripper. Various views are shown, in which the centrifuge is equipped with a tube rack body, in which tubes are opened (as described and illustrated in FIG. 7, sections A and B).

Figure 9:
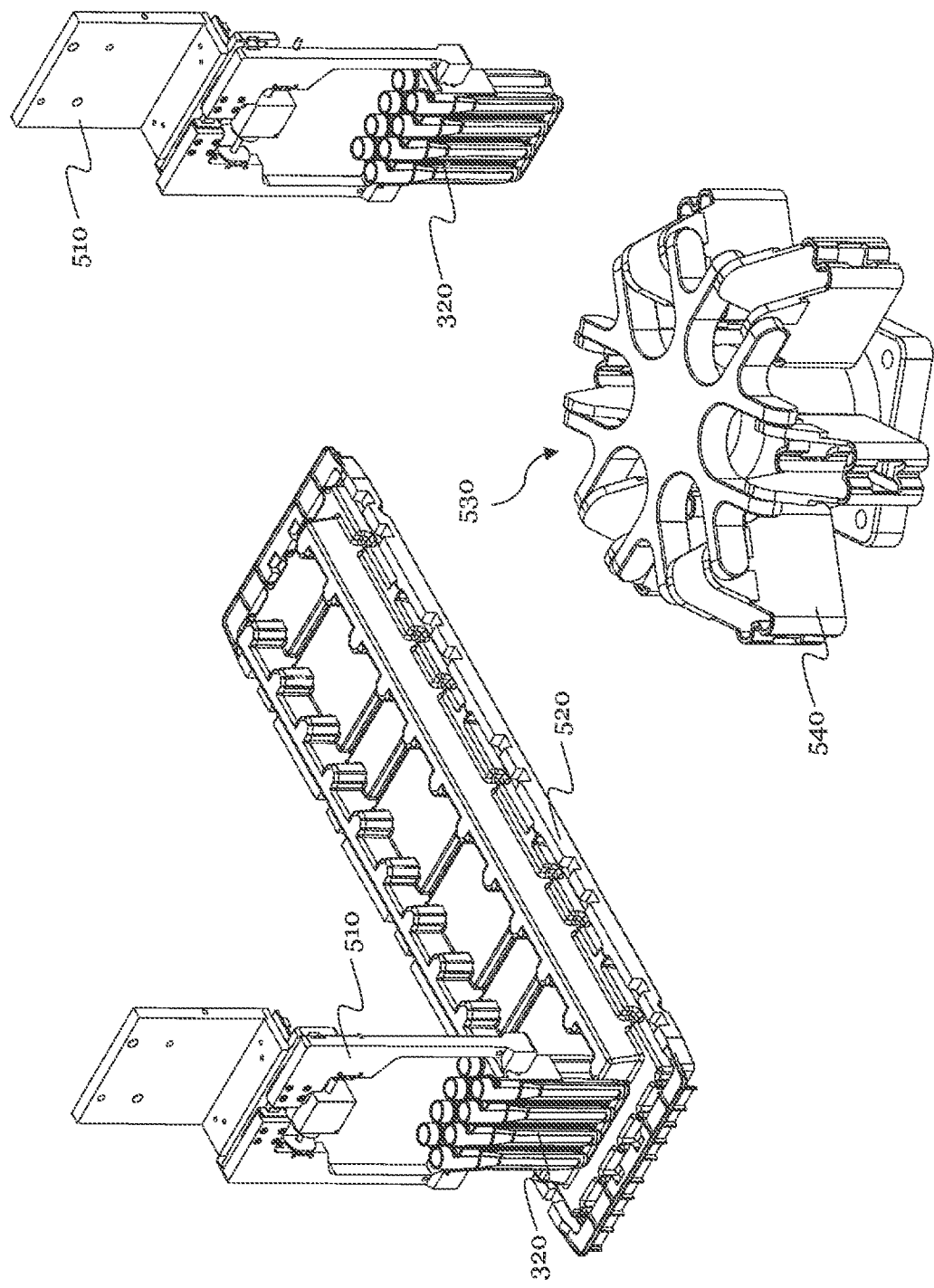

FIG. 9 illustrates an exemplary embodiment of a third step of the method for automated sample processing according to the invention in which a tube rack body (including tubes) is transferred from a centrifuge of the figure) to a tray. Transferring is performed by means of a robot comprising a gripper. The tubes in the tube rack body are opened and tube caps are removed (as described and illustrated in FIG. 8).

Figure 10:
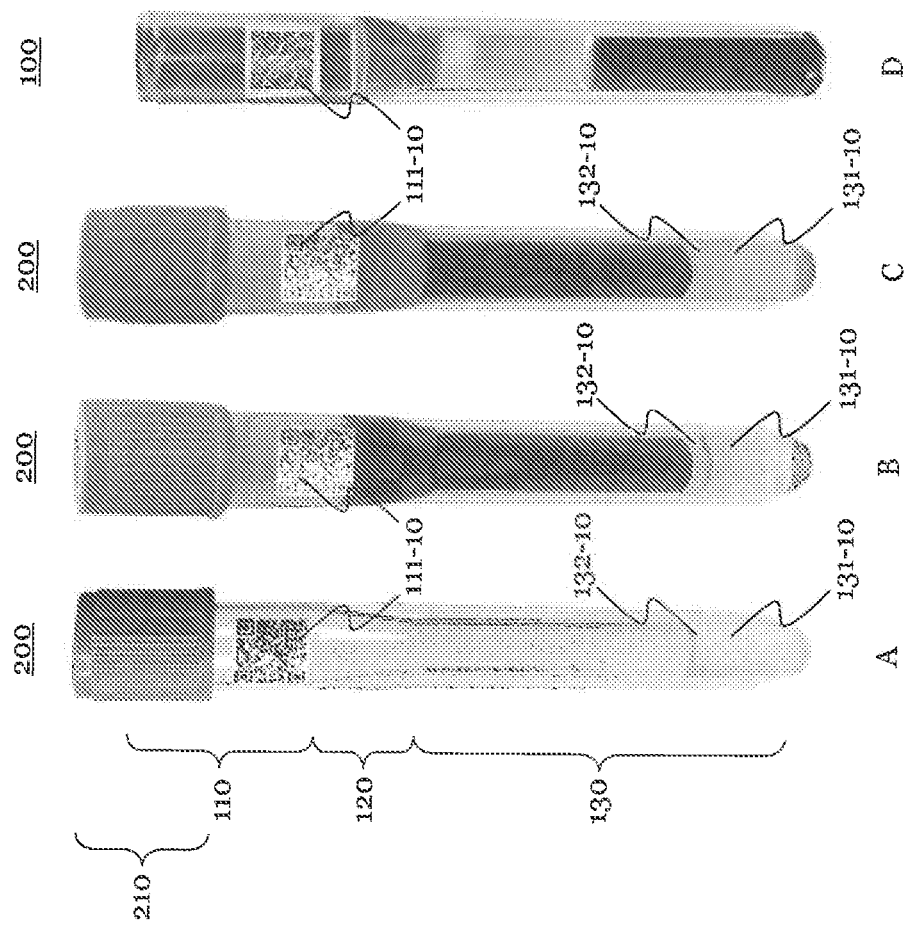

FIG. 10 illustrates an exemplary embodiment of the tube at four (A-D) specific stages in the life-cycle of the tube with focus on the state of some key features of the tube filled with a sample throughout automated processing.

Figure 11:
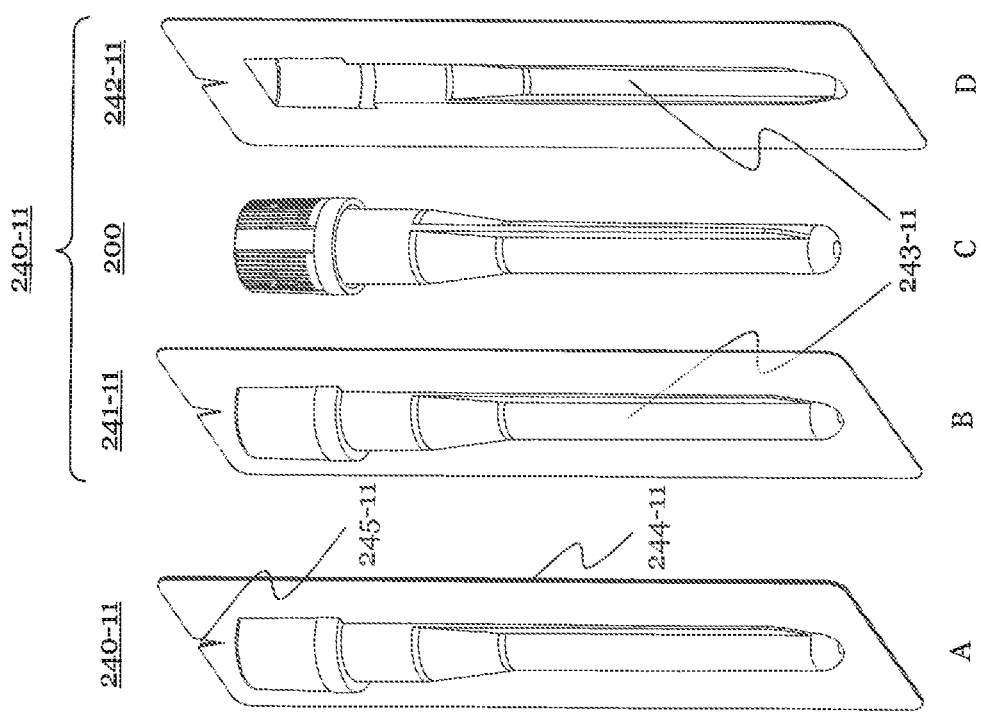

FIG. 11 illustrates an exemplary embodiment of the tube packaging. The figure shows an assembled closed state (A) as well as an opened state (B, D) including the tube (C) for illustrating the relative arrangement of the parts (B, C, D).

EXEMPLARY EMBODIMENTS OF THE TUBE FOR AUTOMATED SAMPLE PROCESSING

Figure 1:
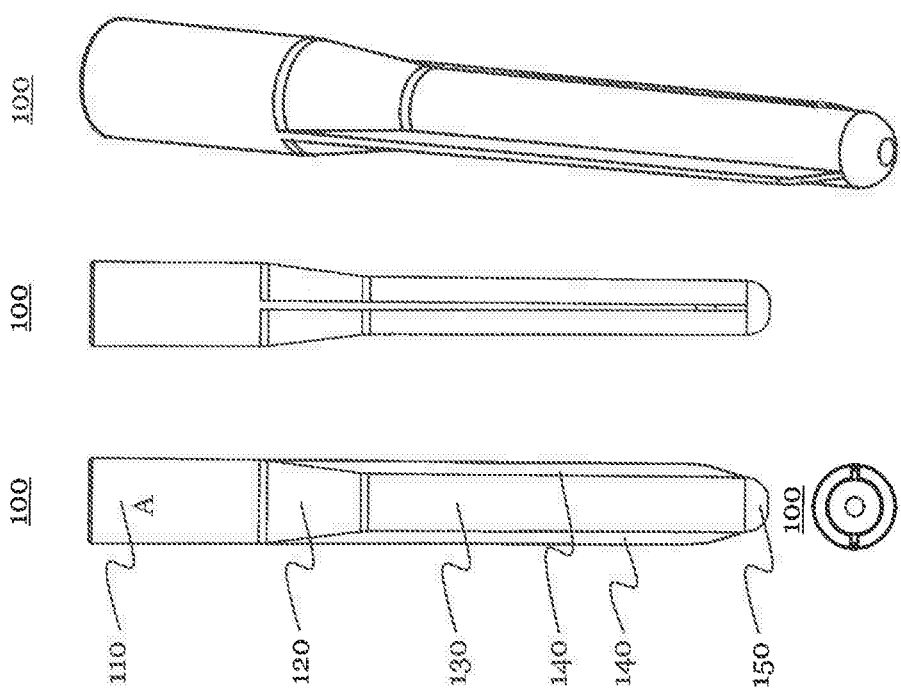
FIG. 1 shows various views of a tube illustrating geometrical features of the tube according to an exemplary embodiment of the invention.

FIG. 1 shows a first and second lateral view, a top view as well as a three-dimensional projection of an exemplary embodiment of a tube (100) according to the invention. The peculiar shape of the tube ensures that platelet and white cells (i.e. the immune cell reservoir) may reach the desired thickness for automated sample processing. Sampling may, for instance, conveniently be performed by pipetting through guidance via a CCD camera, determining layer positions with high precision and therefore maximizing the possible retrieval rate of the immune cell reservoir. In the present embodiment the tube comprises an upper (110), an intermediate (120) and a lower section (130) and it is closed towards the lower end by a spherical ending (150).

The upper section (110) and the lower section (130) are shown to be of substantially of cylindrical shape. The upper section (110) may have an inner diameter larger than an inner diameter of the lower section (130) and the upper section may have an outer diameter larger than an outer diameter of the lower section. The intermediate section (120) which is located between the upper section (110) of the tube and the lower section (130) may be of tapered shape. A top of the intermediate section (120) may connect to a bottom of the upper section and a bottom of the intermediate section may connect to a top of the lower section. An inner diameter and an outer diameter of the intermediate section may decrease from the top to the bottom of the intermediate section of the tube.

Fastening means, which in the present example are shown as tube ribs (140), are located at the outer surface to stabilize the body of the tube and, more importantly, to guide and stabilize the tube when placed e.g. in a rack and centrifuged. As can be seen in FIG. 1, it is preferable that the tube ribs extend along the intermediate section (120) and the lower section (130). The arrangement of the tube ribs is preferably symmetrical, 180° spaced apart from each other (in case two tube ribs are used), and the shape may be such that they substantially extend in parallel to the longitudinal axes of the tube. Moreover, the shape may be such that the distance ranging from an outer edge of a first tube rib to an outer edge of a second tube rib substantially equals the outer diameter of the upper section (130).

The tube may consist of the aforementioned parts, as exemplified in FIG. 1, or may also comprise further parts, such as for example additional fastening means.

A total height of the tube may, for instance, be 100 mm at a volume of approximately 4800 µl. A height of the upper section of the tube may, for instance be 25 mm. A height of the intermediate section (120) may be 16 mm while a height of the lower section (130) together with the spherical ending (150) may be 59 mm. One or several volume marks may be indicated on the tube. The tube may, for instance, be made of plastic or glass by molding or any other material and suitable manufacturing technique.

Figure 2:
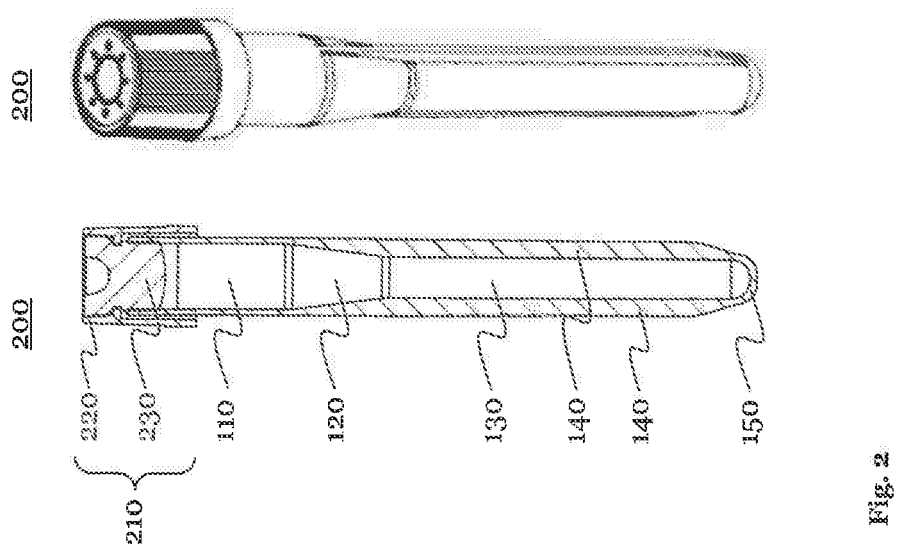
FIG. 2 shows further views of the tube including a tube cap according to an exemplary embodiment of the invention.

FIG. 2 shows a longitudinal cut as well a three-dimensional projection of an exemplary embodiment of the tube (200) including a tube cap (210). The tube cap (210) comprises a tube cap body (220) and a tube cap plug (230). The tube cap may be fastened on the tube (as shown) to seal the tube so that a vacuum in the tube may persist. The tube cap may be pierced by a needle such that an evacuated tube with the tube cap plug inserted into the upper section may receive a sample through the needle pierced into the tube cap plug. The tube cap plug may also seal the tube. The tube may comprise one or more contents (not shown in this figure; shown in FIG. 10). The contents may, for example, comprise a volume of a density gradient medium (cf. (131-10) in FIG. 10) in a lowest portion of the tube. Type of suitable density gradient medium include, but are not limited to: Percoll, Ficoll, iodinated compounds such as Nycodenz, Hypague, Optiprep, or Metrizamide etc, and combinations thereof, such as Ficoll-Paque, Histopaque, Histoprep, Lymphoprep etc, and organic solvents such as silicone fluid. The volume of the density gradient medium (cf. (131-10) in FIG. 10) may be separated towards a portion above the lowest portion of the tube by a volume of a separating gel (cf. (132-10) in FIG. 10) forming a gel barrier between the density gradient medium and the portion above the lowest portion of the tube. The gel barrier facilitates stable storage and transportation of the tube, in order to prevent intermixing (dilution) of sample and density gradient medium prior to centrifugation. As an example, the density gradient medium may have a density between 1.01 and 1.11 g/ml, or between 1.077 and 1.083 g/ml. The volume of the density gradient medium in the tube may be between 100 to 600 µl, preferably between 200 and 600 µl, 300 to 600 µl, 400 and 600 µl, 500 to 600 µl and e.g. 450 µl. The volume of the separating gel in the tube may be between 35 to 60 µl, e.g. preferably 50 µl. An inner surface of the tube above the gel barrier may be coated with an atomized anticoagulant. A maximum volume of the tube above the gel barrier and below the tube cap plug may be evacuated. The tube, the tube cap and the contents of the tube may be sterilized. Sterilization by Gamma irradiation may be mentioned as example.

In one embodiment, silicone fluid is used as density gradient medium (cf. (131-10) in FIG. 10) in the lowest portion of the tube. In this embodiment, it may be possible to refrain from using any separating gel forming a gel barrier. In this case, overall application costs might be further decreased. Also, there might be no need for vacuum sealing or aluminum packaging (described later) to prevent evaporation of the density gradient medium prior to use.

Figure 3:
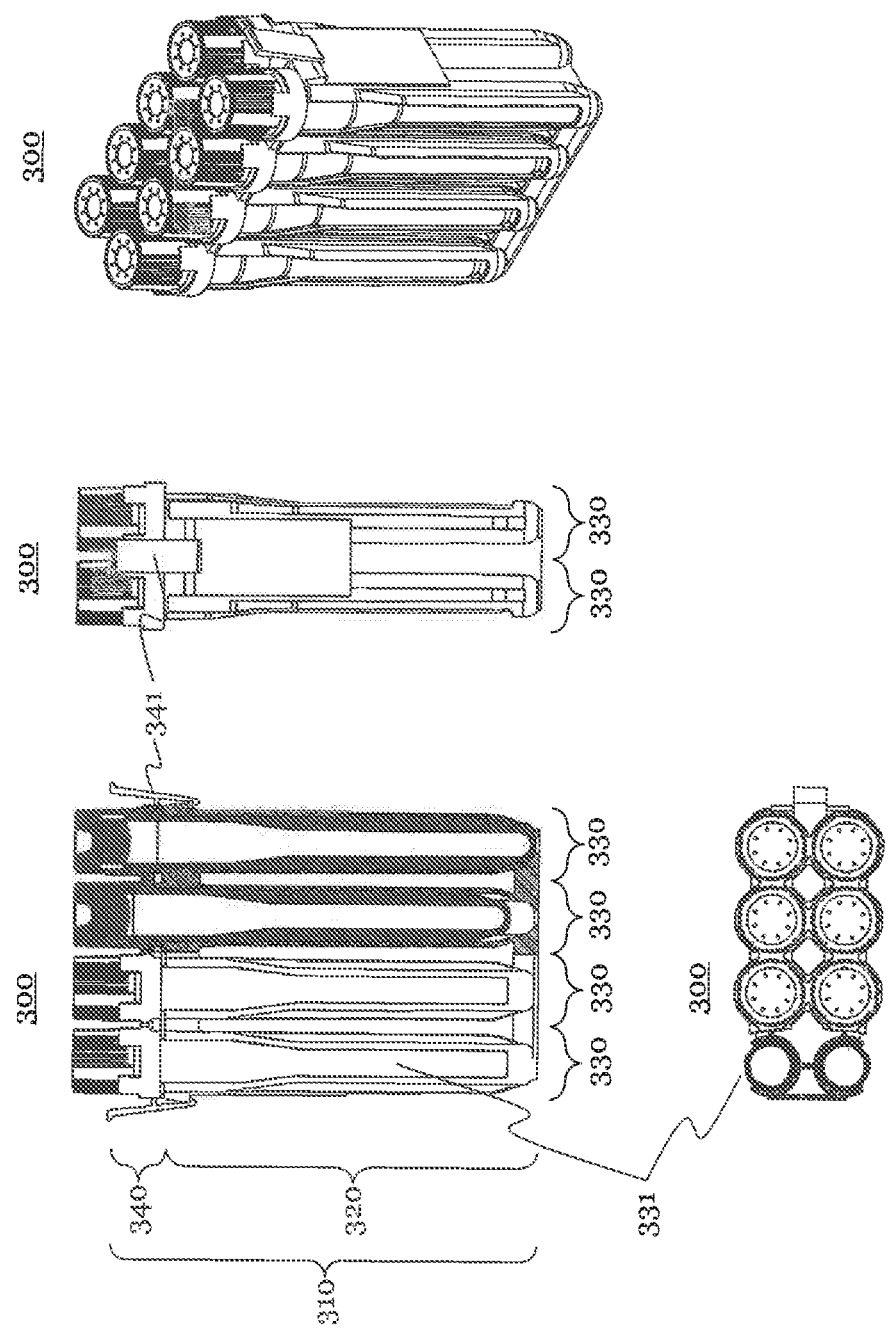
FIG. 3 shows various views of a tube rack including tubes and tube caps, according to an exemplary embodiment of the invention.

FIG. 3 illustrates a tube rack according to an exemplary embodiment of the invention. The tube rack (310) is shown in a longitudinal cut, in a lateral view, in a top view as well as in a three-dimensional perspective, wherein the tube rack is shown with tubes and tube caps inserted (together referred as 300). The tube rack is (310) may comprise a tube rack body (320) including one or more tube holders (330) as well as a tube rack head. The tube rack head (340) is fixed to the tube rack body (310) by means of clippers (341) configured to engage in a recess or the like on the tube rack body. Each tube holder has an opening (331) exhibiting the contents of the tube towards the environment of the tube rack. A wall at the opposite of the opening of each tube may act as a low-noise background for automated content identification (e.g. for a level detecting CCD camera). The wall provides also structural rigidity for the tube rack, in particular for the tube rack body.

As may be seen in the part of the figure showing the tube rack from a longitudinal cut, when the tube cap is plugged and sealing the upper section of the tube and when the tube is placed in one of the tube holders, the tube cap may capture the tube so that there is a gap between the lowest portion of the tube and a bottom of the tube rack body. In the exemplary embodiment show, this is possible because the tube cap rests on the tube rack head. A centrifugation force in an axial direction towards the lower end of the lower section of the tube may thus pull the tube off the tube cap (or vice versa).

Figure 4:
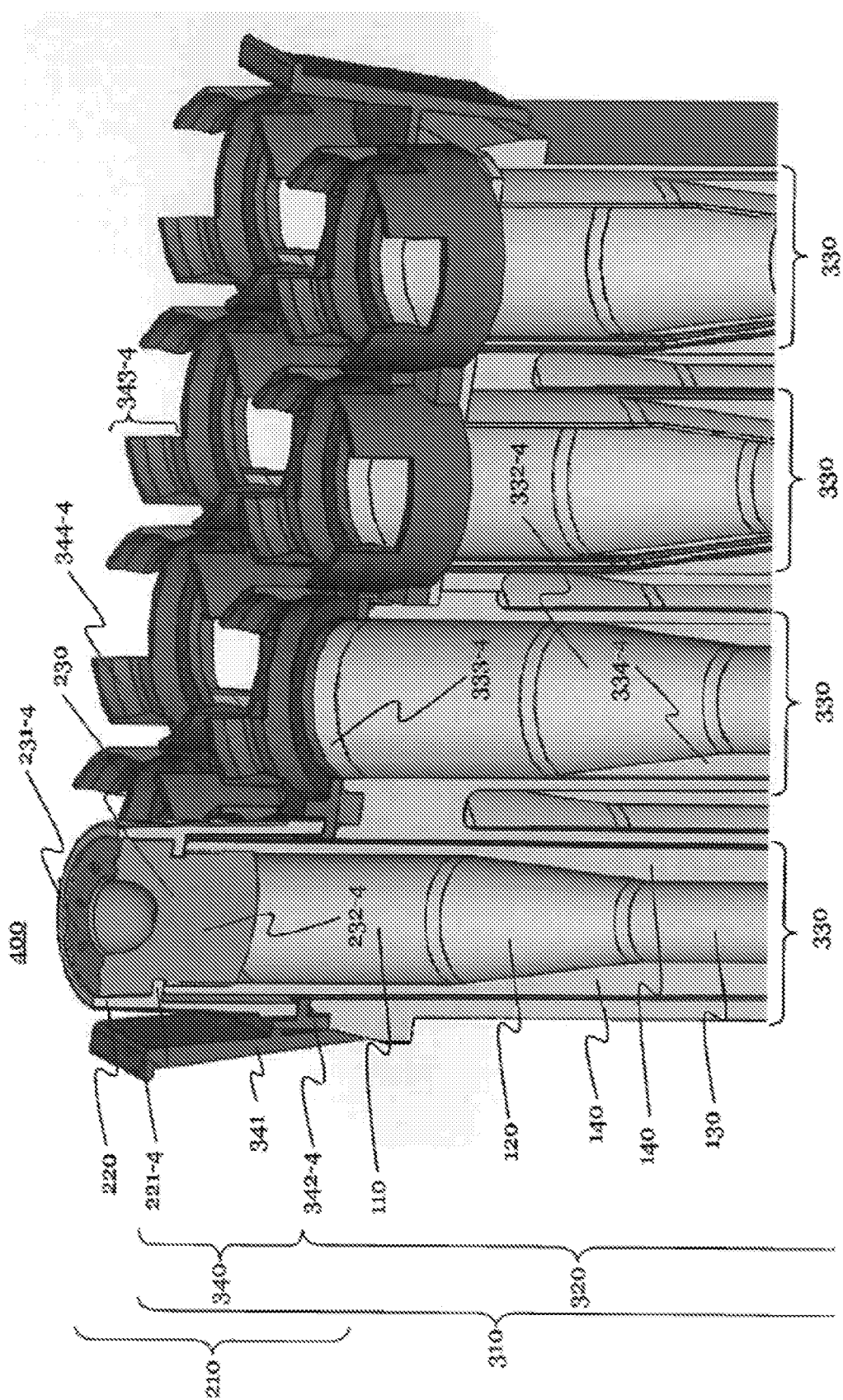
FIG. 4 shows an enlarged section of a longitudinal cut in a three-dimensional view of a part of the tube rack equipped with a tube and a tube cap, according to an exemplary embodiment of the invention.

When the tube is pulled of the tube cap, the tube is sliding in the tube holders towards a bottom of a tube rack. The sliding motion of the tubes is controlled by the tube ribs, which are guided by symmetrical trajectories (c.f. FIG. 4 for an illustration of this feature) in the tube rack body. The tube is opened when a lowest portion of the tube contacts the bottom of the tube rack body.

FIG. 4 shows an enlarged section of a longitudinal cut in a three-dimensional view of a part of the tube rack equipped with a tube and a tube cap (together referred to as 400), according to an exemplary embodiment of the invention. A tube cap (210) may be plugged into the upper section of the tube (110). The tube cap body (220) may comprise a circumferential protrusion (221-4) to engage the tube cap plug (230). Another circumferential protrusion may engage the tube cap body against the tube rack head (340), i.e. the tube rack body (320), i.e. against the centrifugation force in an axial direction towards the lower end of the lower section of the tube may, which may pull the tube off the tube cap. The tube cap plug may seal the tube. In one example, the tube cap plug may be punctured by a needle such that a sample is pulled in the tube by the vacuum in the evacuated tube.

As is shown in FIG. 4, the tube cap may fit smoothly into a crown-shaped upper part (343-4) of the tube rack head, in which it may be fixed by an inwardly extending bump (344-4). The tube rack head, in turn, may fit smoothly onto the tube rack body. Protruding rings (333-4) above each tube holder (330) may fit smoothly to the groove (342-4) of the tube rack head such that the tube rack head (and hence the tubes) are fixed in their positions. Clippers (341) may fix the tube rack head to the tube rack body, which, for instance, helps minimizing the risk of cross-contamination during centrifugation. Cross-contamination is also mitigated by the fastening means located on parts of the outer surface of the tubes, which were for example shown as tube ribs 140 in FIGS. 1 and 2. These tube ribs help stabilizing the tube during centrifugation and guiding the tube along the symmetrical trajectories when it is being opened, i.e. when it is sliding downwards (in the direction of the lower section of the tube). An upper portion of a symmetrical trajectory is shown in FIG. 4.

FIG. 5 illustrates a first step of the method for automated sample processing according to the invention. In this step, a tube rack that may be of the type set forth above in the exemplary embodiments of the invention, including one or more tubes, which may also be of the type as set forth above in the exemplary embodiments of the invention, is transferred from a tray to a support location in a centrifuge. The transferring is performed by means of a robot comprising a gripper.

As shown in FIG. 5, the tube rack (310) includes tubes and tube caps. By means of the robot comprising the gripper (530), the rube racks are easily transferred from a tray full of tube racks (520, shown in a three-dimensional view on the left) to a support (540) located in a centrifuge (530, shown in a three-dimensional view on the right).

FIG. 6 shows a various views of a centrifuge before centrifugation, according to an exemplary embodiment according to the invention. The centrifuge is fully equipped with tube racks as has been illustrated in FIG. 5 and described above. Sections A and B of FIG. 6 show enlarged sections of longitudinal cuts of the tube racks, when placed in the centrifuge. Sections A and B of FIG. 6 also illustrate that the tubes are closed in the tube rack before centrifugation.

More particularly, section A of FIG. 6 illustrates that the tubes are closed in the tube rack before centrifugation as detailed in FIGS. 3 and 4. The tube cap body (220) may rest on the tube rack head and hold the tube cap plug (230) by means of a circumferential protrusion (221-4). The tube rack head may, in turn, rest on the protruding rings (333-4) above each tube holder. The clippers may fix the tube rack head to the tube rack body. Section B illustrates that there is a gap between the lowest portion of the tube and a bottom of the tube rack body. Symmetrical trajectories (334-4) may receive the tube ribs to stabilize the tubes in the tube rack (i.e. the tube holders) and guide their opening movement during centrifugation.

FIG. 7 shows various views of a centrifuge during a second step of the continuous two-step centrifugation according to the invention, according to an exemplary embodiment. The centrifuge is fully equipped with tube racks as has been illustrated in FIG. 5 and described above. Sections A and B show enlarged sections of longitudinal cuts of the tube racks, when the centrifuging is performed in the centrifuge. Sections A and B of FIG. 7 also illustrate that the tubes are opened in the tube rack throughout the second step of the continuous two-step centrifugation.

More particularly, as is shown in FIG. 7, the tube racks are placed in the support. Section A illustrates that the tubes are opened in the tube rack throughout the second step of the continuous two-step centrifugation when the sealing force is smaller than the centrifugation force. The tube cap body (220) may rest on the tube rack head and hold the tube cap plug (230) by means of a circumferential protrusion (221-4). The tube cap plug may be moved out of the upper section of the tube (110). The tube rack head, in turn, may rest on the protruding rings (333-4) above each tube holder. The tube caps may remain fixed in the tube rack head (340) in its crown-shaped upper part in which bumps (c.f. FIG. 4) fix the tube caps to the tube rack head. The tube may slide towards the bottom of the tube rack until the spherical ending (150) was stopped at the bottom of the tube rack. The sliding movement may be guided by symmetrical trajectories receiving the tub ribs (140) for each tube.

The continuous two-step centrifugation serves for enhanced sample enrichment and minimize cell loss in a tube. In general, larger and denser particles sediment at lower centrifugal force, and smaller and less dense particles fractionate at very high centrifugal force. When red blood cells in whole blood are aggregated, some cells are trapped in the clumps and therefore sediment with the red blood cells. This tendency to trap cells may be reduced by the adoption of continuous two-step centrifugation method without the need to pre-dilute the sample. Said method particularly comprises the steps of:

centrifuging for a first period of time at a first relative centrifugation force (RCF) without changing a relative position of the density gradient medium in the tube to achieve an initial cell separation, wherein the first period of time is at least 10 minutes, preferably at least 15 minutes and most preferably in the range of 15 to 20 minutes, and the first RCF is in the range of 50 to 200 RCF, and most preferably in the range of 150 to 200 RCF, and centrifuging for a second period of time at a second RCF, in order to change the relative position of the density gradient medium in the tube (cf. (131-10) in FIG. 10) by break the gel barrier formed by the separating gel (cf. (132-10) in FIG. 10) in the tube by accelerating to the range of 400 to 800 RCF, preferably in the range of 400 to 650 RCF, without stopping the centrifuging, wherein the second period of time is at least 5 minutes, preferably at least 15 minutes, and most preferably in the range of 15 to 30 minutes.

FIG. 8 illustrates an exemplary embodiment of a third step of the method for automated sample processing according to the invention. In said step, after said continuous two-step centrifugation method, the tube rack head is extracted from the tube rack body by grabbing the tube rack head such that the clippers disengage the tube rack body. This is carried out by means of a robot.

More particularly, as shown in FIG. 8, the tube rack head including tube caps may be extracted from the tube rack body including tubes such that the clippers disengage the tube rack body. Extracting may be performed by means of the robot comprising the illustrated gripper. Various views of this steps are shown in FIG. 8, in which the centrifuge is equipped with a tube rack body, in which tubes are opened (as described and illustrated in FIG. 7, sections A and B).

FIG. 9 illustrates an exemplary embodiment of a fourth step of the method for automated sample processing according to the invention. In said step, after said extraction of the tube rack head, the tube rack body is extracted from the support of the centrifuge by grabbing the tube rack body. This is again carried out by means of a robot.

More particularly, as shown in FIG. 9, the tube rack body including tubes may be transferred from the centrifuge to a tray. Transferring may be performed by means of the robot comprising the gripper. The tubes in the tube rack body are opened and tube caps are removed (as described and illustrated in FIG. 8).

FIG. 10 illustrates an exemplary embodiment of the tube at four (A-D) specific stages in the life-cycle of the tube with focus on the state of some key features of the tube filled with a sample throughout automated processing. The tube in FIGS. 10 A-D has a label adhered, printed or engraved on the outer surface of the upper section of the tube. In the embodiment shown in FIG. 10, a QR-code (111-10) is adhered to the front-side on the outer surface. Other identification labels such as barcodes and RFID labels can also be used and be adhered on a front-side or a back-side of the tube. It should also be mentioned that, in addition to the label, on the outer surface of the intermediate section, a marker may indicate a preferred volume of sample in the tube. The marker may, for instance, be engraved or dull polished. Such a marker may be helpful as guidance for a practitioner.

FIG. 10 A shows the tube in an off-the-shelf state before venipuncture. In this state the volume of the density gradient medium (131-10) is separated towards a portion above the lowest portion of the tube by a volume of a separating gel (132-10) forming a gel barrier between the density gradient medium and the portion above the lowest portion of the tube. An inner surface of the tube above the gel barrier is coated with an atomized anticoagulant. The volume of the tube above the gel barrier and below the tube cap plug is evacuated. The tube cap plug may then be punctured by a needle such that the sample is pulled in the tube by the vacuum into the evacuated tube.

FIG. 10 B shows the tube (200, tube with tube cap inserted) when a sample (whole blood in the present case) was pulled into the tube. The density gradient medium (131-10) remains separated towards the sample above the lowest portion of the tube by the volume of the separating gel (132-10) forming the gel barrier between the density gradient medium and the sample in the tube. In this state the tube is ready for processing with the centrifuge.

FIG. 10 C shows the tube (200, tube with tube cap inserted) including the sample after performing a first centrifugation step within the enhanced continuous two-step centrifugation method (cf. FIGS. 6 to 7). The first centrifugation step includes centrifuging for a first period of time at a first RCF. The first RCF is applied without changing the relative position of the density gradient medium in the tube to achieve an initial cell separation. It can be seen, that the whole blood sample is initially separated. Further processing may allow to achieve an enhanced purity of the samples components, such that the reliability and sensitivity of the subsequent screening methods may be greatly increased. In this state the tube is ready for a second centrifugation step which includes further centrifuging for a second period of time at a second RCF to achieve said enhanced purity of the samples components. Centrifuging is typically not stopped when transitioning from the first centrifugation step to the second centrifugation step.

FIG. 10 D shows the tube (100, without tube cap) including the sample after performing a second centrifugation step within the enhanced continuous two-step centrifugation method (c.f. FIGS. 6 to 7). The second centrifugation step includes centrifuging for a second period of time at a second RCF. The second RCF separates the tube cap (210) from the tube (100, tube without tube cap) and releases the density medium (131-10) below the gel barrier (132-10). It can be seen, that the whole blood sample is further separated as compared the initial separation after the first centrifugation step (cf. FIG. 10 C). Most importantly, the PBMC layer is clearly visible below the intermediate section with sufficient thickness. In this state the tube may leave the centrifuge for further processing. Qualitative and quantitative analysis may be mentioned as examples which may make use of the enhanced purity of the samples components as achieved after finishing the second centrifugation step.

FIG. 11 shows an assembled closed state (A) as well as an opened state (B, D) of the tube packaging (240-11) including the tube (C, 200, tube with tube cap inserted). The tube packaging comprises a first (241-11) and a second (242-11) packaging shell. The packaging shells may fit the tube seamlessly. The seamless fit makes sure that there is essentially no space for air in the tube packaging when the tube is placed therein. Hence, disadvantages due to diffusion of liquids or gasses across the body of the tube (e.g. evaporation of the density gradient medium in the tube prior to use) are minimized and the durability of the tube is enhanced. The inner surface of the packaging shells may have an alumina coating (243-11) to protect the tube, e.g. also against UV radiation. An alumina foil may be used as an alumina coating (243-11), for instance an alumina foil with a thickness of 0.2 mm, which may seamlessly fit into the (inner) shape of the packaging shells (241-11, 242-11). The edges (244-11) of the packaging shells may be heat sealed after placing the tube in the packaging shells. A score (245-11) at an edge of the packaging shells may provide a means to facilitate the opening of tube packaging. As compared to the absence, the presence of such scores typically greatly enhance the application experience of a user and leads to less damaging. While the exemplary embodiment shown in FIG. 11 shows packaging shells for a single tube, packaging shells for several tubes are also possible, e.g. packaging shells for eight tubes, wherein each tube is placed in its own independent pocket, as shown in FIG. 11. Tubes may also be vacuum sealed and packed in an aluminum packaging to prevent evaporation of the density gradient medium in the tube prior to use. However, a manufacturing procedure for heat sealing is more easily automated than a procedure for vacuum sealing. Hence, even if both vacuum and heat sealing could be used, if it is intended to keep the manufacturing costs low, heat sealing only is preferred.

Finally, a preferred embodiment of the manufacturing process of the tubes is described:

According to an exemplary embodiment, two injection inlet points are located at the outer edge of the tube's upper section. This method of injection molding guarantees concentricity from top to bottom of each tube. The thickness of the walls is substantially equal for each tube, e.g. apart from manufacturing tolerances as will be understood by the person skilled in the art. The method may also prevent the problem of eccentric tubes—as is often present when using conventional methods where the injection is usually made from the bottom—that may randomly affect the pressure in the tube when evacuated, which, in turn may affect the volume of the collected sample.

REFERENCE NUMERALS

100 tube (without tube cap)
110 upper section
111-10 label (e.g. QR code)
120 intermediate section
130 lower section
131-10 density gradient medium
132-10 separating gel
140 fastening means (tube rib)
150 spherical ending
200 tube (with tube cap inserted)
210 tube cap
220 tube cap body
221-4 circumferentially protrusion
230 tube cap plug
231-4 upper cylindrical bar
232-4 lower cylindrical bar
240-11 tube packaging
241-11 first packaging shell
242-11 second packaging shell
243-11 alumina coating
244-11 edges (of the packaging shells)
245-11 score (of the packaging shells)
300 tube rack (with tubes and tube caps inserted)
310 tube rack (without tubes and tube caps inserted)
320 tube rack body
330 tube holder
331 opening
332-4 wall
333-4 protruding ring
334-4 symmetrical trajectory
340 tube rack head
341 clipper
342-4 groove
343-4 crown-shaped upper part
344-4 inwardly extending bump
400 tube rack (cross-section, with tubes and tube caps inserted)
520 tray
530 centrifuge
540 support

The invention claimed is:

1. A continuous two-step centrifugation method for enhanced sample enrichment in a tube for sample collection and sample processing, the tube comprising:
    an upper section, an intermediate section, and a lower section; and
    a volume of a density gradient medium contained in the lower section of the tube,
    wherein the upper section and the lower section are substantially of cylindrical shape, the upper section has an inner diameter larger than an inner diameter of the lower section, the upper section has an outer diameter larger than an outer diameter of the lower section, and the intermediate section is located between the upper section of the tube and the lower section,
    wherein a top of the intermediate section connects to a bottom of the upper section and a bottom of the intermediate section connects to a top of the lower section,
    wherein an inner diameter and an outer diameter of the intermediate section decreases from the top to the bottom of the intermediate section of the tube;
    wherein the intermediate section has a tapered shape;
    the method comprising the steps of:
    centrifuging for a first period of time at a first RCF (relative centrifugation force) without changing a relative position of the density gradient medium in the tube to achieve an initial cell separation, and centrifuging for a second period of time at a second RCF, in order to change the relative position of the density gradient medium in the tube.

2. The method of claim 1, the tube further comprising a plurality of fastening means for fixing the tube in a tube rack, wherein the plurality of fastening means is located on an outer surface of the intermediate section and the lower section.

3. The method of claim 2, wherein the plurality of fastening means comprises a plurality of longitudinally extending tube ribs for fixing the tube in the tube rack.

4. The method of claim 1, wherein the outer diameter at the top of the intermediate section is substantially equal to the outer diameter of the upper section, and the inner diameter at the top of the intermediate section is substantially equal to the inner diameter of the upper section.

5. The method of claim 1, wherein the inner diameter at the bottom of the intermediate section is substantially equal to the inner diameter of the lower section, and the outer diameter at the bottom of the intermediate section is substantially equal to the outer diameter of the lower section.

6. The method of claim 3, wherein the plurality of tube ribs are spaced apart at equal distances.

7. The method of claim 6, wherein the plurality of tube ribs are two tube ribs that are spaced apart 180° from each other.

8. The method of claim 3, wherein the plurality of tube ribs substantially extends along the whole length of the intermediate section and the lower section.

9. The method of claim 3, wherein the outer diameter of the upper section is substantially equal to a distance ranging from an outer edge of a first tube rib of the plurality of tube ribs to an outer edge of a second tube rib of the plurality of tube ribs.

10. The method of claim 3, wherein one or more of the following dimensions are met:
the inner diameter at the top of the intermediate section of the tube is 10.5 mm, the inner diameter at the bottom of the intermediate section of the tube is 6.5 mm, and a thickness of the tube ribs is 2.0 mm.

11. The method according to claim 1, wherein the tube is manufactured by plastics injection molding or wherein the tube is made of glass.

12. The method according to claim 1, wherein:
the first period of time is at least 10 minutes and the first RCF is in the range of 50 to 200 RCF, and
the second period of time is at least 5 minutes and the second RCF is in the range of 400 to 800 RCF.

13. The method of claim 1, the tube further comprising a tube cap,
wherein the tube cap is insertable into the upper section such that the tube cap seals the tube, and the tube cap is configured to be held against a force in an axial direction towards the lower end of the lower section of the tube such that the tube is pulled off the tube cap by the force.

14. The method of claim 13, wherein the tube cap further comprises a tube cap body and a tube cap plug,
wherein the tube cap plug is insertable into the upper section such that the tube cap plug seals the tube, and
wherein the tube cap body is configured to be arranged around the upper section and to engage the tube cap plug, and is further configured to be held against a force in an axial direction towards the lower end of the lower section of the tube such that the tube is pulled off the tube cap by the force.

15. The method of claim 14, wherein the tube cap is pierceable by a needle such that an evacuated tube with the tube cap inserted into the upper section receives a sample through the needle pierced into the tube cap.

16. The method of claim 15, wherein the tube cap body has substantially the shape of a cylindrical tube,
wherein an inner diameter of a lower portion of the tube cap body is substantially equal to the outer diameter of the upper section, and
wherein an inner diameter of an upper portion of the tube cap body is substantially equal to the diameter of an upper cylindrical bar of the tube cap plug.

17. The method of claim 15, wherein the tube cap body comprises at least two circumferentially protrusions to engage the tube cap and the tube cap plug.

18. The method of claim 14, wherein the tube further comprises a gel barrier that separates the volume of the density gradient medium from a portion of the tube that is above the density gradient medium,
wherein an inner surface of the tube above the gel barrier is coated with an atomized anticoagulant, and
wherein when the tube cap is inserted into the upper section, a maximum volume of the tube above the gel barrier and below the tube cap is evacuated.

19. The method of claim 14, wherein the tube, the tube cap, and contents of the tube are sterilized.

20. The method according to claim 18, wherein the density gradient medium has a density between 1.01 and 1.119 g/ml, and/or wherein the volume of the density gradient medium is between 100-600 μl, and/or the volume of the separating gel is between 35-60 μl.

21. The method according to claim 20, wherein the density gradient medium has a density between 1.077 and 1.083 g/ml, and/or wherein the volume of the density gradient medium is 450 μl, and/or the volume of the separating gel is 50 μl.

22. A method for automated sample processing comprising:
transferring, via a robot comprising a gripper, a tube rack comprising one or more
tubes from a tray to a support located in a centrifuge, wherein the tube rack comprises a tube rack body, comprising one or more tube holders, wherein each of the tube holders is shaped to seamlessly receive one of the tubes, the one or more of the tubes each comprising:
an upper section, an intermediate section, and a lower section; and
a volume of a density gradient medium contained in the lower section of the tube,
wherein the upper section and the lower section are substantially of cylindrical shape, the upper section has an inner diameter larger than an inner diameter of the lower section, the upper section has an outer diameter larger than an outer diameter of the lower section, and the intermediate section is located between the upper section of the tube and the lower section,
wherein a top of the intermediate section connects to a bottom of the upper section and a bottom of the intermediate section connects to a top of the lower section,
wherein an inner diameter and an outer diameter of the intermediate section decreases from the top to the bottom of the intermediate section of the tube;
wherein the intermediate section has a tapered shape;
the method comprising applying at the centrifuge a continuous two-step centrifugation method for enhanced sample enrichment that comprises the steps of:

centrifuging for a first period of time at a first RCF (relative centrifugation force) without changing a relative position of the density gradient medium in the tube to achieve an initial cell separation, centrifuging for a second period of time at a second RCF, in order to change the relative position of the density gradient medium in the tube;

after the continuous two-step centrifugation method, extracting, via the robot, a tube rack head from the tube rack body by grabbing the tube rack head such that clippers comprised in the tube rack head disengage the tube rack body; and after the extraction of the tube rack head, extracting, via the robot, the tube rack body from the support of the centrifuge by grabbing the tube rack body.

23. The method according to claim 22, wherein:

the first period of time is at least 10 minutes and the first RCF is in the range of 50 to 200 RCF, and the second period of time is at least 5 minutes and the second RCF is in the range of 400 to 800 RCF.

\* \* \* \* \*